No. 803,677. PATENTED NOV. 7, 1905.
J. S. DUNCAN.
ADDRESSING MACHINE.
APPLICATION FILED MAY 7, 1904.
8 SHEETS—SHEET 5.
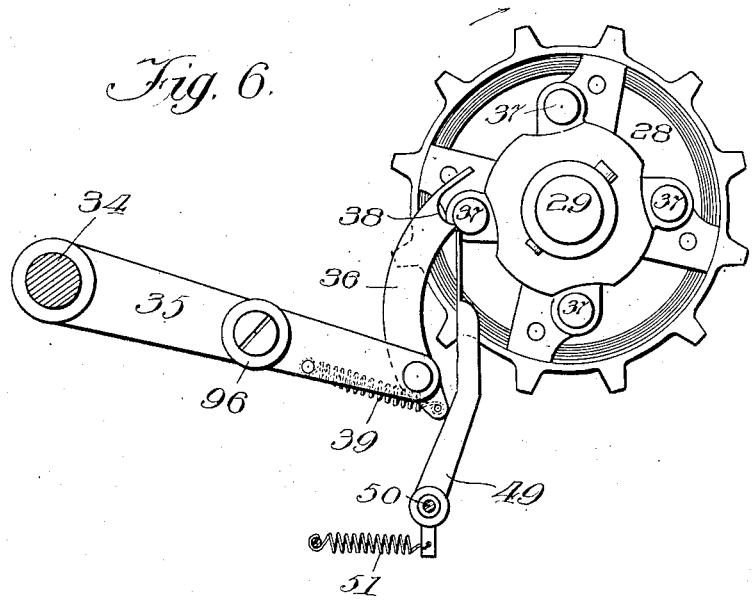
Fig. 6.
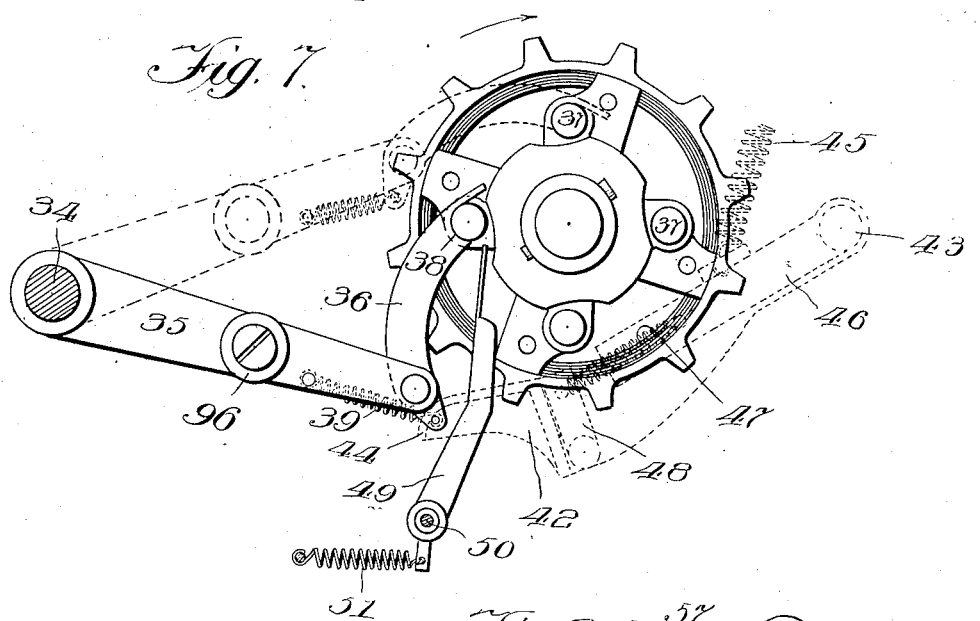
Fig. 7.
Fig. 8.
Witnesses:
H. S. Gaither
Frances B. Allen
Inventor:
Joseph S. Duncan
by Wm. O. Belt
Attorney.

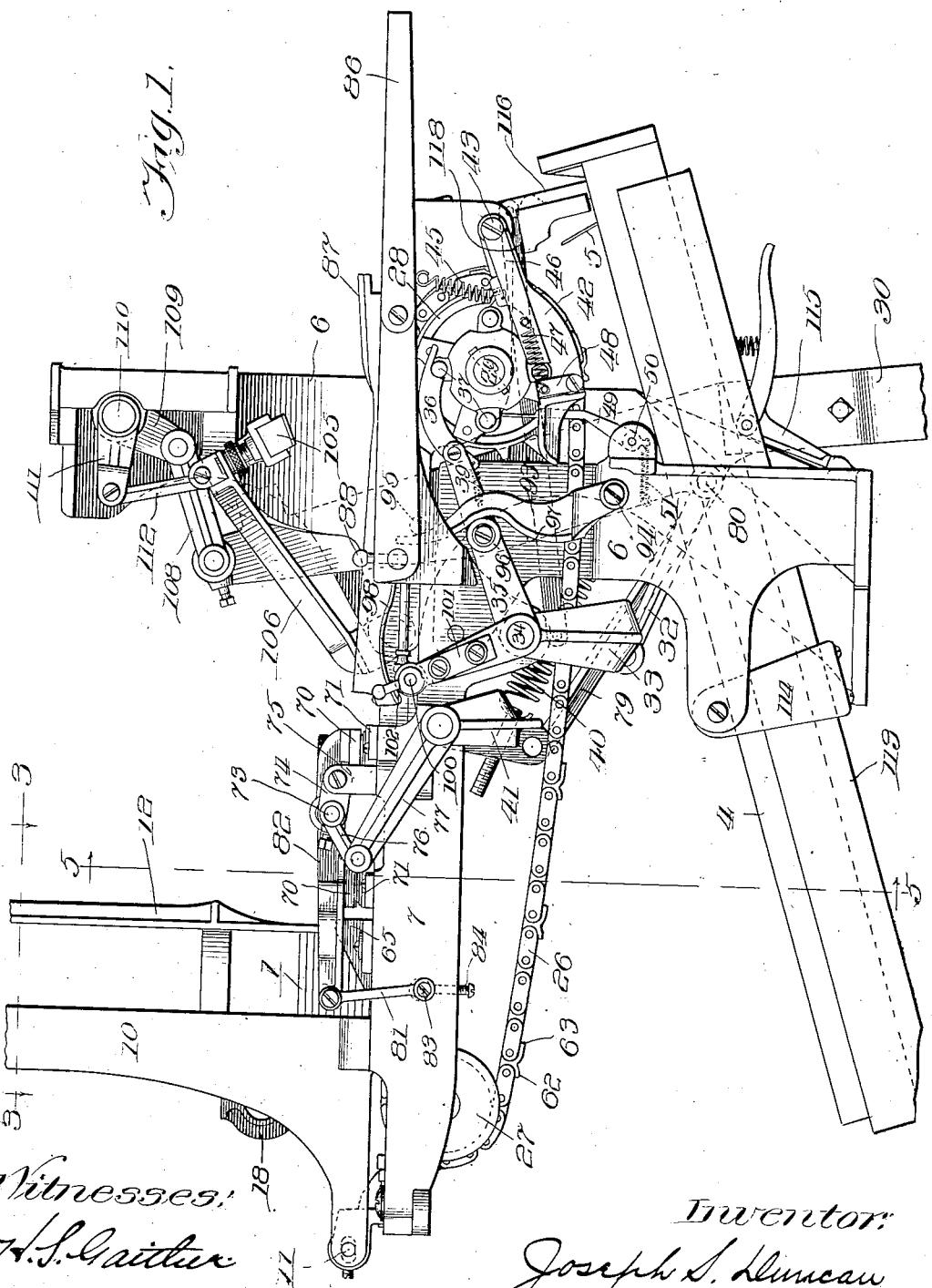

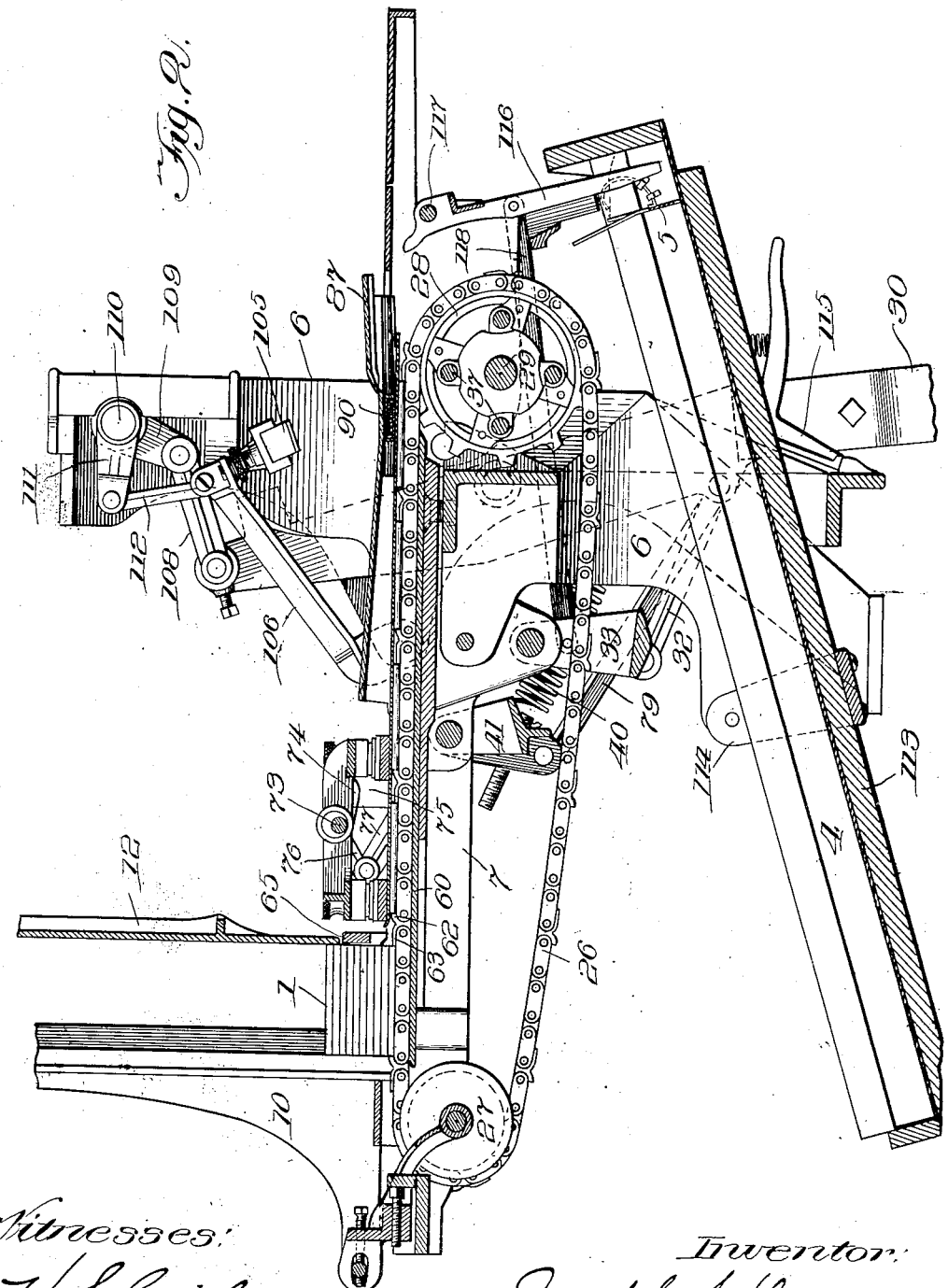

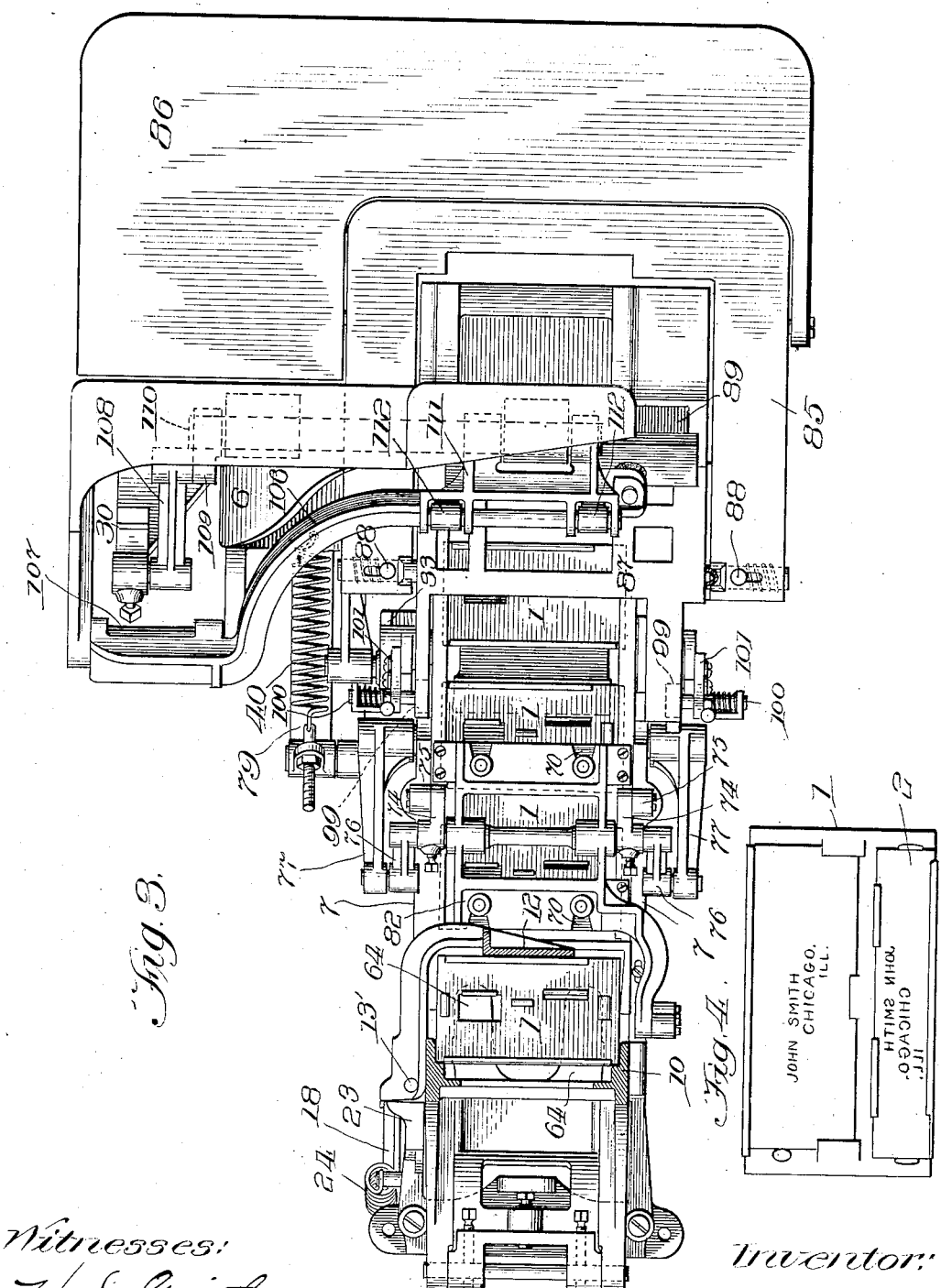

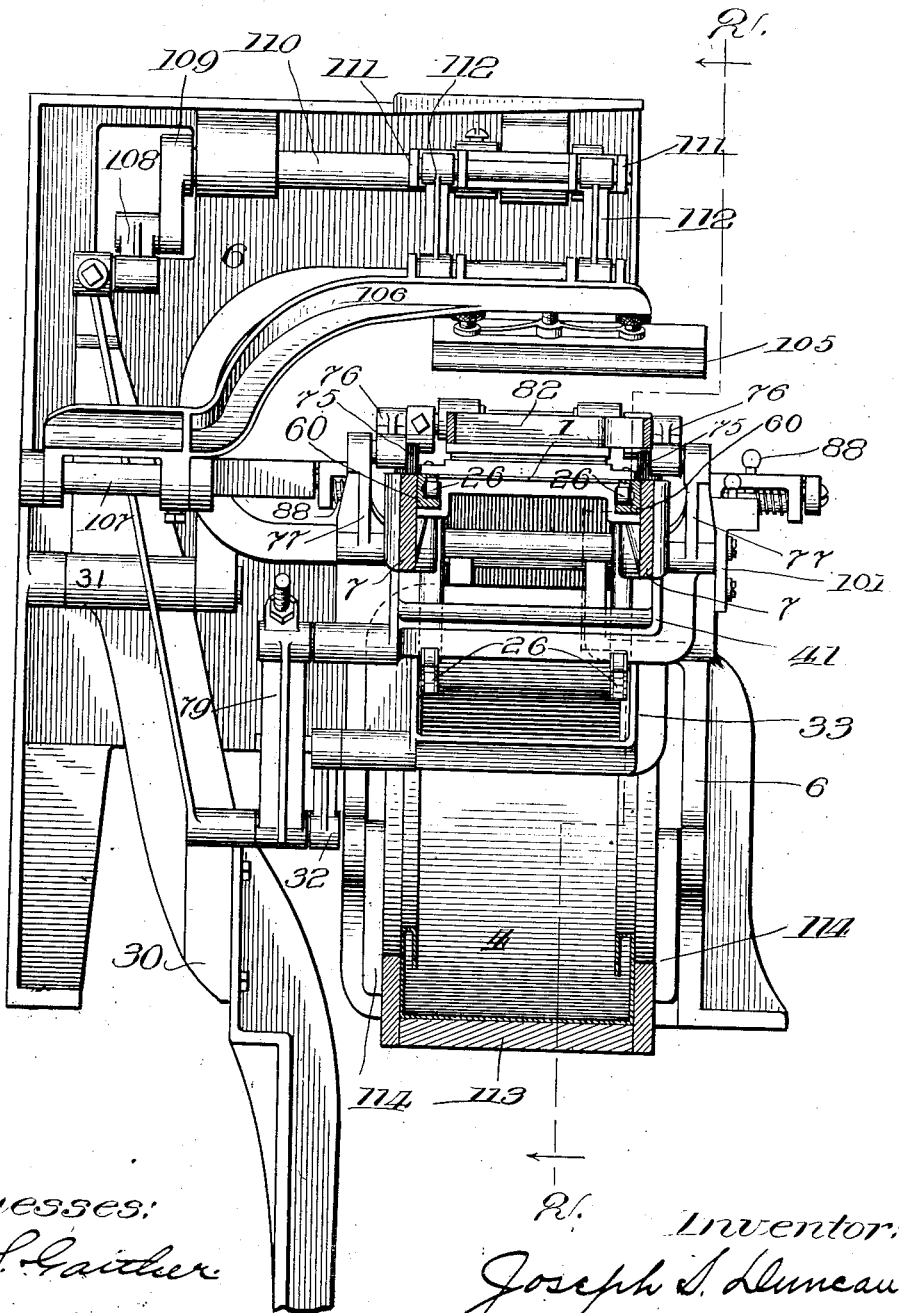

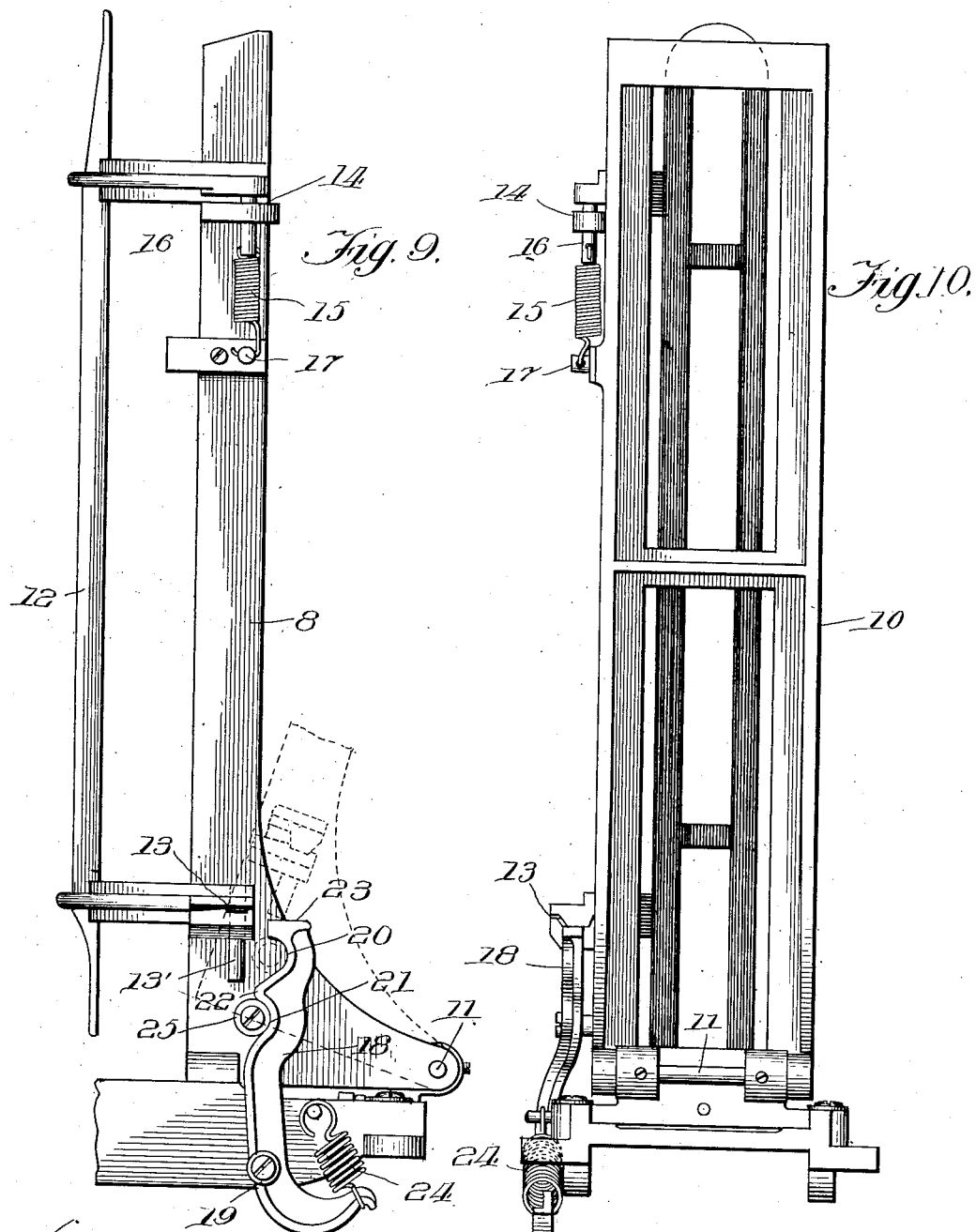

No. 803,677. PATENTED NOV. 7, 1905.
J. S. DUNCAN.
ADDRESSING MACHINE.
APPLICATION FILED MAY 7, 1904.
8 SHEETS—SHEET 7.
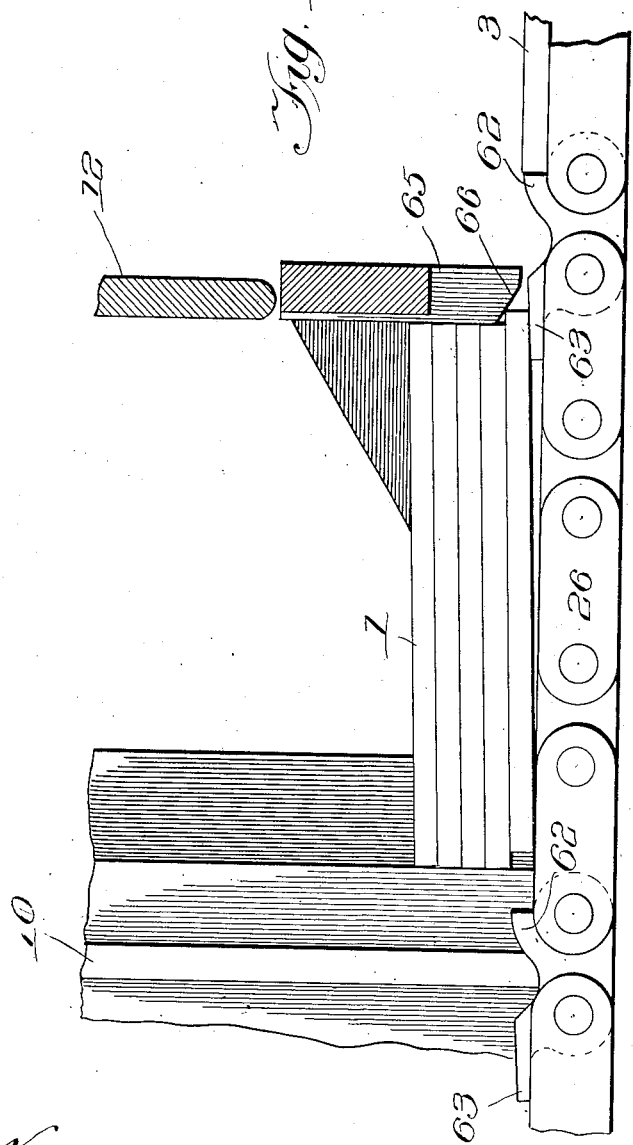
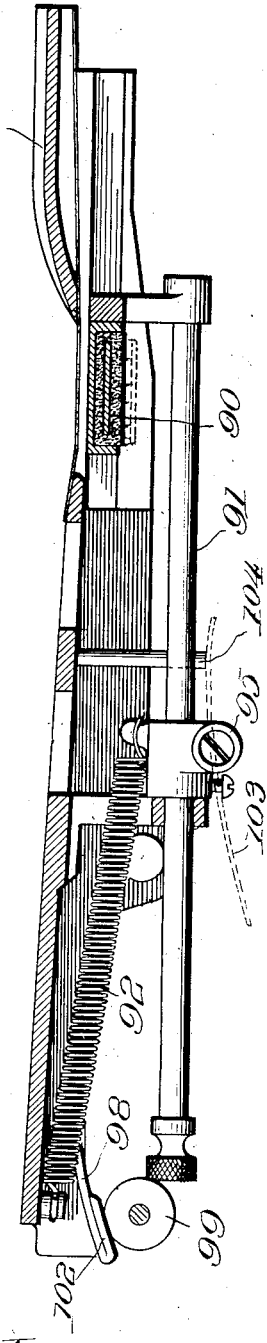
Witnesses:
H. S. Gaither
Francis B. Allen
Inventor:
Joseph S. Duncan
by Wm. A. Bell
Attorney No. 803,677. PATENTED NOV. 7, 1905.
J. S. DUNCAN.
ADDRESSING MACHINE.
APPLICATION FILED MAY 7, 1904.

8 SHEETS—SHEET 8.

Witnesses:
H. S. Gaither.
Frances B. Allen.

Inventor:
Joseph S. Duncan
by Wm. O. Belt
Attorney

UNITED STATES PATENT OFFICE.

JOSEPH S. DUNCAN, OF CHICAGO, ILLINOIS, ASSIGNOR TO ADDRESSO-GRAPH COMPANY, OF CHICAGO, ILLINOIS, A CORPORATION OF ILLINOIS.

ADDRESSING-MACHINE.

No. 803,677.   Specification of Letters Patent.   Patented Nov. 7, 1905.

Application filed May 7, 1904. Serial No. 206,904.

*To all whom it may concern:*

Be it known that I, JOSEPH S. DUNCAN, a citizen of the United States, residing at Chicago, in the county of Cook and State of Illinois, have invented certain new and useful Improvements in Addressing-Machines, of which the following is a specification.

This invention relates to machines for printing addresses or other subject-matter on envelops or other material.

The object of this invention is to provide an automatic machine of simple construction adapted to be rapidly operated to move a number of separate printing devices one at a time from a supply into printing position and to deposit the printing devices in a storing-receptacle after taking a clear and distinct impression therefrom.

It is also an object of this invention to provide a machine for operating with printing devices which are stored in accordance with and forming part of a card-index system, and the machine is adapted to receive a stack of printing devices from a storing-tray and deposit them after the printing operation into the tray in the same order and position in which they originally stood.

Other objects of the invention are to facilitate the feeding of the printing devices from the stack, to insure the regular movement of the carrier, to automatically close the magazine when it is moved to normal position, and to insure proper inking of the printing devices and prevent the inking device from moving laterally in engagement with the printing devices; and the invention has other objects in view, which will be pointed out hereinafter in the detailed description of the one embodiment of the invention which has been chosen for illustration.

Figure 13:
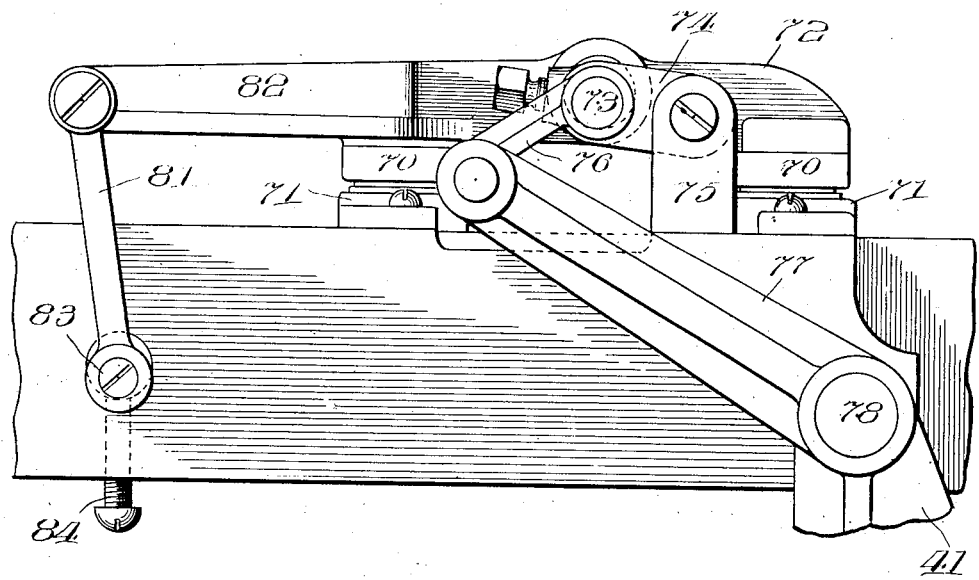
Figure 14:
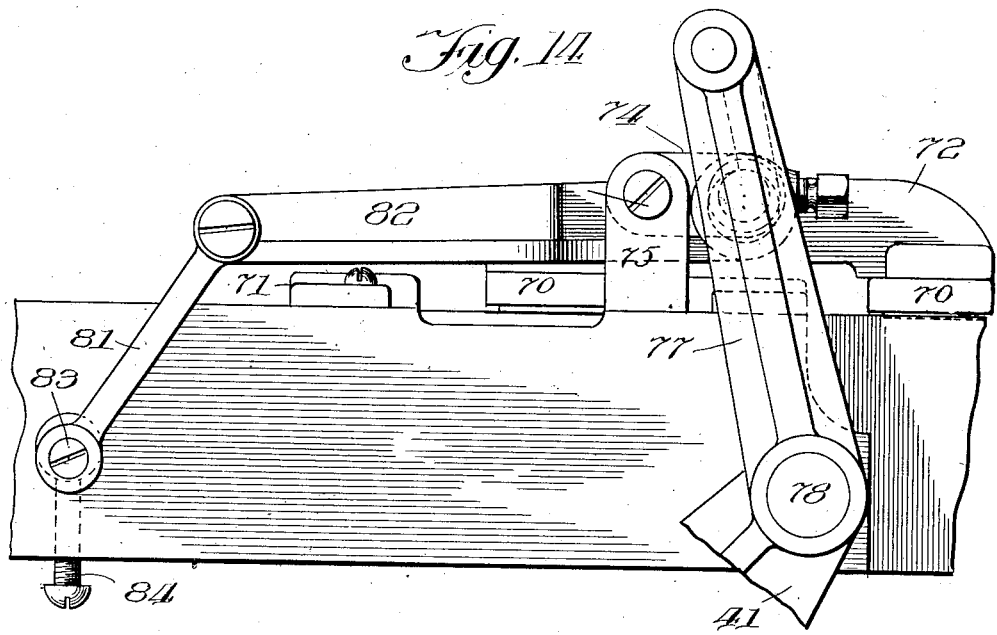

Referring to the drawings, Figure 1 is a side elevation. Fig. 2 is a sectional view on the line 2 2 of Fig. 5. Fig. 3 is a plan view of the major part of the machine, the magazine being shown in section on the line 3 3 of Fig. 1. Fig. 4 illustrates the printing devices which may be used with the machine. Fig. 5 is a sectional view on the line 5 5 of Fig. 1. Figs. 6 and 7 are detailed views showing the carrier, feeding, and locking devices. Fig. 8 shows another form of locking device which may be used. Fig. 9 is a side elevation, and Fig. 10 is a rear elevation, of the magazine. Fig. 11 is an enlarged detail sectional view of a portion of the magazine and carrier. Fig. 12 is a longitudinal sectional view of the envelop-plate. Figs. 13 and 14 are enlarged detailed views showing the inking device in its two positions.

I have illustrated in the drawings one form of the printing device 1, covered by Letters Patent No. 692,994, dated February 11, 1902, which comprises a printing-plate 2, carried by a holder 3; but I do not in any way restrict this invention to a construction adapted for or to its use with this or any other special kind of printing device, and in the consideration of the invention I desire to have it understood that I use the term "printing device" in its broadest sense as comprehending any kind of printing device which can be used with my machine or for which the machine can be adapted without departing from the scope of the invention. I have also shown a tray 4 for holding the printing devices of the kind disclosed in my application, Serial No. 154,519, filed April 27, 1903, and this tray is provided with a follower 5; but this does not form a part of the present invention, and other trays or storing-receptacles for the printing devices may be employed with the machine.

The frame of the machine is preferably made in two parts, and for convenience in describing the construction I will refer to it as comprising, generally, a supporting-frame 6 and a carrier-frame 7, the latter extending rearwardly from the supporting-frame. The printing devices are deposited from the tray into a magazine 8, Figs. 9, 10, which is pivotally mounted at 11 at the rear end of the carrier-frame and rests thereon when in normal position. A front 12 is hinged to the side of the magazine, and one of the hinges, as 13, is preferably of the ordinary shutter-hinge variety, which will to a certain extent lock the front when in closed position. The other hinge 14 may be of any suitable character, and a spring 15 is fastened at one end to the pintle 16 of said hinge and to the frame of the magazine at 17. An arm 18 is pivoted at 19 to the carrier-frame and is provided with sockets 20 and 21, an intermediate shoulder 22, and a flat top 23. The magazine is held rigidly in upright position by means of a spring 24, which holds the arm 18 against the stud 25 on the magazine, with the stud seated in the socket 21. In this position the printing devices in the tray can be discharged into the magazine after first throwing back the swinging front 12 by inserting the rear end of the tray into the bottom of the magazine and turning it to upright position. Then the tray and magazine are forced back into tilted position, as shown in dotted lines in Fig. 9, by applying sufficient pressure to overcome the tension of spring 24 and carry the stud 25 over the shoulder 22 and into the socket 20, and the pintle 13' of the hinge 13 will rest upon the top of the arm 18. The tray can then be removed from the magazine to leave the printing devices stacked therein, and the magazine is moved back to upright position by applying sufficient pressure to carry the stud 25 over the shoulder 22 and into the socket 21. As the magazine is moved from tilted position to upright position the front will be raised sufficiently, by reason of the engagement of the pintle 13' with the top of the arm 18, to release the members of the shutter-hinge 13 from their locked engagement, and the spring 15, which has been stretched lengthwise and torsionally, will thereupon cause the front to swing around into closed position by the time the magazine has reached upright position. In this way I provide for automatically closing the front of the magazine and prevent accidental displacement of the printing devices, which might happen if the front of the magazine were permitted to remain open during the movement of the magazine from tilted to upright position.

The carrier preferably comprises a pair of sprocket-chains 26, which travel on grooved pulleys 27 at the rear end of the carrier-frame and on the sprocket-wheels 28, mounted on the shaft 29, journaled in bearings in the supporting-frame. A pedal-lever 30, pivoted at 31 on the supporting-frame, is connected by a link 32 to a yoke 33, which is fastened rigidly on the rock-shaft 34, Fig. 1. This rock-shaft carries an arm 35, and at the end of said arm is a finger 36, which is adapted to engage the stud 37 on one side of one of the sprocket-wheels 28, Figs. 6, 7. The finger is preferably provided with a socket 38 at its end to receive the studs 37, and it is held in position to engage the studs by a spring 39.

It will be readily understood that when the pedal-lever is pushed backward to rock the shaft 34 the arm 35 will be carried down into the position shown in full lines in Fig. 7 and the finger engaged with one of the studs 37, and on the return movement of the pedal-lever the arm will be carried up into the position shown in dotted lines in Fig. 7, and in this movement the finger will turn the sprocket-wheels 28 one step, which constitutes one step in the feeding movement of the printing devices from the magazine to printing position. This return movement of the pedal-lever is effected by a spring 40, which is fastened at one end to a yoke 41 and at its other end to the supporting-frame.

To lock the carrier during the printing operation, I provide an arm 42, which is pivoted at one end to the supporting-frame at 43 and has its other end 44 arranged to be engaged by the arm 35 on its downward movement. A spring 45 is fastened to the supporting-frame and to a supplemental arm 46, which is also pivoted to the supporting-frame at 43 and is connected by a spring 47 to a pivoted buffer 48 on the arm 42. In Fig. 1 one of the studs 37 is shown locked between the buffer 48 and the free end of the supplemental arm 46, so that the sprocket-wheels will be prevented from turning and the carrier will be held stationary. When the arm 35 is swung downward, the end 44 of the arm 42 is engaged and carries the locking device, which comprises said arm 42 and the supplemental arm 46, down out of engagement with the stud 37 and into the position shown in dotted lines in Fig. 7. On the return upward movement of the arm 35 to feed the sprocket-wheel a quarter-turn one of the studs 37 (the stud opposite to the stud engaged by the finger 36 in the construction illustrated) will engage the upper edge of the supplemental arm 46 and press it downward against the tension of the spring 47 until it rests against the buffer 48, whereupon the spring 47 will pull the supplemental arm up in position behind the stud, so that the stud will be locked between the end of said supplemental arm and the buffer, as shown in Fig. 1.

It is desirable to prevent any movement of the carrier less than a full step in the feeding operation to avoid improper feeding and delivery of the printing devices, and for this purpose I provide the throw-out arm 49, which is pivoted to the supporting-frame at 50 and is held under tension of the spring 51. The upper end of this arm is arranged in the path of movement of the studs 37, and it will throw out the finger 36 from engaging the next stud on the sprocket-wheel until said finger has by engaging the preceding stud moved the wheel a quarter-turn.

In Fig. 6 I have shown the sprocket-wheel almost at the end of one quarter-turn, which would be a complete step in the feeding operation, and it will be observed that the finger 49 still remains in engagement with the stud to prevent the feeding-finger 36 from engaging said stud to turn the sprocket-wheel. When the quarter-turn is completed, the finger 49 will be moved by the spring 51 into the position shown in Fig. 7 in the path of the next stud to prevent the feeding-finger 36 from again operating the sprocket-wheel until one step in the feeding operation has been completed.

In Fig. 8 I have shown another form of locking device which comprises a locking-arm 52, to be pivoted to the frame at 53 and provided with a pivoted buffer 54, which has a socket 55 to receive the studs. A spring 56 is attached to the arm 52 at 57 and to the buffer at 58. The spring-buffer in this construction, as well as in the construction heretofore described, provides a yielding stop for the studs of the sprocket-wheel and prevents shocks to the feeding and locking devices. It will be readily understood that the stud of the sprocket-wheel rides against the arm at 59 and depresses the arm sufficiently against the tension of the spring 56 to permit the stud to enter the socket 55. This single arm thus dispenses with the supplemental arm 46 heretofore described, and the operation is with this exception substantially similar to that of the locking device illustrated in Figs. 1, 6, and 7.

The sprocket-chains travel in the guides 60 on the carrier-frame, and they are provided at corresponding intervals with feed-dogs 62, Fig. 11. These feed-dogs may constitute links in the chains, as shown, and they are provided with rearwardly-extending projections 63, which are so spaced with relation to the dogs as to provide just sufficient room between a projection and a following dog to receive a printing device. When the magazine is in tilted position, the printing devices rest upon the bottom formed by the projections 64, Fig. 3; but when the magazine is moved into upright position the printing devices rest directly upon the carrier. At the bottom of the magazine is a stationary front 65, which is fastened to the carrier-frame and is provided with a beveled inner edge 66. If the carrier should move forward before the lowest printing device in the magazine drops down squarely in position behind the projection 63, said device will be carried forward by the following dog 62 into engagement with this beveled edge 66 and be forced down into position upon the carrier before being injured by the movement of the carrier. As a matter of fact, in the ordinary operation of the machine the printing device which is being moved from the magazine by the carrier will drag the printing device resting upon it forward to the position shown in Fig. 11; but the beveled edge 66 will prevent two of the printing devices from being fed from the magazine at one time by retarding the forward movement of the printing device resting on the lowermost one in the magazine as the latter is moved forward by the carrier.

The rearward projection 63 on the feeding-dogs forms a partial support for the stack of printing devices during the feeding operation, and the beveled edge of the front of the magazine permits the printing device above the lowermost device to move forward, as shown in Fig. 11, while said lowermost printing device is being fed from the stack. If the feeding-dogs engage the rear edge of the lowermost printing device before the forward edge thereof has dropped squarely upon the carrier, the feeding-dogs will simply push the forward edge of the printing device against the beveled edge of the magazine-front, and this will cause the printing device to slide down into proper position behind the feeding-dogs in front thereof. The projection 63 has a downwardly and rearwardly inclined upper face to enable it to slide easily under the stack of printing devices in the magazine and to avoid presenting a sharp corner for engagement with the printing devices during its movement under the stack.

The printing devices are each inked twice, preferably while being moved from the magazine to printing position. The inking mechanism comprises the inking-pads 70, which normally rest upon the ink-supply pads 71, and are carried by a frame 72 on opposite sides of a crank-shaft 73, journaled in the frame. The ends of the shaft 73 are pivotally connected by links 74 to standards 75 on the carrier-frame and by links 76 to the end of the arms 77, which are rigidly mounted on the rock-shaft 78, to which the yoke 41 is fastened, and the arms 77 and yoke 41 constitute cranks on this rock-shaft for reciprocating the inking-pads forward to inking position and back to the supply-pads at each operation of the machine. A link 79 connects the yoke 41 to the pedal-lever at 80. A link 81 is pivotally connected at one end to the arm 82, extending rearwardly from the frame 72, and this link is pivotally mounted at its other end on an eccentric stud 83, which is securely held in adjusted position in the carrier-frame by the screw 84. The ends of the shaft 73, to which the links 74 and 76 are connected, are eccentric to the intermediate portion which carries the frame, and hence in the operation of the inking mechanism, in which the inking-pads are carried by the frame 72 from position at rest on the ink-supply pads, Fig. 13, forward into inking engagement with two of the inking devices, Fig. 14, the inking-pads are caused to move for a short distance in substantially vertical planes when adjacent to the ink-supply pads and the printing devices. In this way I prevent any lateral or dragging or pushing movement of the inking-pads against the ink-supply pads or the printing devices, and this saves considerable wear on the inking-pads and in other respects facilitates a proper inking operation.

At the front of the machine I provide a flange 85, to which a table 86 may be fastened to facilitate the handling of sheets of large size to be printed. A plate 87 of skeleton form, which I will designate the "envelop-plate" for convenience, is pivotally secured to the table 85 by the spring-pressed latches 88, and this envelop-plate is provided with an opening 89, located just above the printing device in printing position. A sliding pad 90, Fig. 12, is carried by a rod 91 on the under side of the envelop-plate, and this pad is arranged to engage the form immediately after it reaches printing position and until the platen starts on its downward movement. This pad constitutes a supplemental inking device to distribute the ink evenly and smoothly on the printing-form, and it is held normally at printing position by the spring 92 and is projected forward out of printing position before the printing operation takes place by an arm 93, which is pivoted to the supporting-frame at 94 and has its free end arranged behind in engagement with a roller 95 on the rod 91, Fig. 1. A roller 96 on the arm 35 travels against the arm 92, and the latter is provided with a cam-face 97, against which said roller travels. As the arm 35 moves downward in synchronism with the platen the roller 96 will engage the cam-face 97 and cause the arm 93 to quickly push the pad 90 forward out of printing position before the platen engages the envelop or other work to press it against the form.

It is desirable to lift the pad 90 from engagement with the form before moving it laterally, as just described, and for this purpose I provide the arms 98 on the rear end of the envelop-plate and the rollers 99, carried by spring-pressed bolts 100, on the arms 101, which are rigidly fastened on the shaft 34. The arms 98 are curved eccentrically to the arc of movement of the arms 101, and at the rear end and on the under side thereof is a block 102, Fig. 12, which can be conveniently formed by bending over the end of the arms. When the parts are in the position illustrated in Fig. 1, the rollers 99 have reached the limit of their rearward movement and rest beneath the blocks 102 at the rear end of the arms 98, and the front end of the envelop-plate is thereby held down with the pad in engagement with the form. On the forward movement of the arms 101 the rollers carried thereby will run off of the blocks 102, and thereupon the spring-plate 103, which is fastened to the frame and engages the post 104 on the under side of the envelop-plate in advance of its pivot, will raise the front end of the envelop-plate for a sufficient length of time to permit the pad 90 to be raised and carried forward out of engagement with the form, as previously described, after which the rollers 99 will travel against the eccentric portion of the arms 98 and lower the front end of the envelop-plate during the printing operation, so that the platen may carry the envelop-plate into printing engagement with the form without mutilating the envelop.

The platen 105 is carried by an arm 106, mounted on a pivot 107 in the supporting-frame, Figs. 1, 3, and 5. This platen is operated by the pedal-lever with suitable connections which comprise a link 108, connecting the upper end of the pedal-lever with the crank-arm 109 on the crank-shaft 110, mounted in bearings in the top of the supporting-frame. This crank-shaft also carries the crank-arms 111, which are connected by links 112 with the end of the platen-arm. When the pedal-lever is operated, the upper end swings forward and rocks the crank-shaft 110 to swing the platen-arm 106 on its pivot and cause the platen to engage and press the envelop on the envelop-plate into contact with the form. On the return movement of the pedal-lever the platen is again elevated, as shown in Fig. 1. After the printing operation is completed the printing device is discharged from printing position into the tray 4, which rests upon the support 113, carried by the swinging bracket 114 and held in tilted position by the arm 115. The follower is pushed forward to the front end of the tray after the printing devices have been discharged into the magazine, and this can be done by hand or by the device described in my application, Serial No. 163,433, filed June 27, 1903, no claim for said device being made in this application. I also provide a packer 116 for moving the follower and the printing devices in the tray back to provide room for the next printing device at each operation of the machine, and this packer is pivoted to the frame at 117, Fig. 2, and is operated coincident with the rearward movement of the pedal-lever by a link 118, which connects the packer with the yoke 33.

In practice the printing devices in the tray are discharged into the magazine, as heretofore described, with those printing devices which were at the back of the tray located at the bottom of the magazine and resting upon the carrier. In the machine illustrated in the drawings each printing device takes four steps to printing position; but this is not arbitrary, and, if desired, the number of steps can be increased or decreased without departing from the invention. The inking-pads 70 are spaced apart to engage two printing devices at the same time, and hence each printing device will first be inked while at rest on its first step by the rear inking-pad and then be inked a second time while at rest on its second step by the front inking-pad. It will be observed in this connection that the inking devices, the platen, and the envelop-plate-operating devices all move into operative position on the initial or backward movement of the pedal-lever while the carrier remains at rest and while the aforementioned devices are returning to normal position. On the return or forward movement of the pedal-lever the carrier is operated to advance another printing device into printing position and move another printing device forward its first step from the magazine. The operation of the several groups of the devices has been set forth in the detailed description of the construction thereof, and it is not deemed necessary to repeat the same.

The several parts of the machine operate automatically and are timed in their movements to produce the desired results with rapidity and accuracy. The printing devices are repacked in the tray after the printing operation is completed in the same position in which they originally stood, and this enables the printing devices to be arranged in the order of a card-index system and constantly maintained in proper order regardless of the printing operations. The envelops can also be preserved as they are printed in accordance with the order of the card-index system.

While machines of this character are very largely used for the purpose of addressing envelops, postal and mailing cards, they are also used for many other purposes, such as addressing letters, bills, statements, &c., and for preparing pay-rolls. Of course it is immaterial as regards the machine itself whether it is used to print an address or any other subject-matter for any purpose and on any material.

Without limiting myself to the exact construction and arrangement of parts herein shown and described, what I claim, and desire to secure by Letters Patent, is—

1. In an addressing-machine, the combination of a belt-carrier, a stack of printing devices supported on the carrier, and feeding-dogs on the carrier arranged to move the lowermost printing device in the stack forward to printing position, said dogs being constructed to partly support the stack while moving the lowermost device from the stack.

2. In an addressing-machine, the combination of a belt-carrier composed of a pair of link chains, a stack of printing devices, and feeding-dogs on the carrier arranged to move the addressing devices one by one to printing position, said dogs having rearward projections to partly support the stack while the dogs are moving the lowermost device from the stack.

3. In an addressing-machine, the combination of a belt-carrier, means for intermittently operating said carrier, and throw-out means to prevent the beginning of another step until the carrier has completed a full step in its movement.

4. In an addressing-machine, the combination of a belt-carrier, means for intermittently operating said carrier, and means for disengaging said operating means to prevent the beginning of another step until the carrier has completed a full step in its movement.

5. In an addressing-machine, the combination of a belt-carrier, means for intermittently operating said carrier comprising a sprocket-wheel, a finger for turning said wheel, and means for disengaging the finger from the wheel to prevent the beginning of another step until the carrier has completed a full step in its movement.

6. In an addressing-machine, the combination of a belt-carrier, and means for intermittently operating said carrier comprising a sprocket-wheel, a finger for turning said sprocket-wheel, and an arm for disengaging the finger from the wheel to prevent the beginning of another step until the carrier has completed a full step in its movement.

7. In an addressing-machine, the combination of a belt-carrier, and means for intermittently operating said carrier comprising a sprocket-wheel, studs at the side of the wheel, a finger arranged to engage the studs to turn the wheel, and a throw-out arm in the path of movement of the studs to prevent the beginning of another step until the carrier has completed a full step in its movement.

8. In an addressing-machine, the combination of a belt-carrier, and means for intermittently operating said carrier comprising a sprocket-wheel, studs at the side of said wheel, a rocking arm, and a spring-pressed finger pivotally mounted on the arm and arranged to engage said studs to turn the sprocket-wheel.

9. In an addressing-machine, the combination of a belt-carrier, means for intermittently operating said carrier comprising a sprocket-wheel, studs at the side of said wheel, a rocking arm, a finger carried by said arm and arranged to engage the studs to turn said wheel, and an arm arranged to prevent the finger from engaging the stud until by its engagement with the preceding stud it has moved the wheel and caused the carrier to complete a full step in its movement.

10. In an addressing-machine, the combination of a belt-carrier, means for intermittently operating said carrier comprising a wheel, studs at the side of the wheel, and a device for engaging one of said studs to lock the wheel and the carrier during the printing operation.

11. In an addressing-machine, the combination of a belt-carrier, means for intermittently operating said carrier comprising a wheel, studs at the side of said wheel, and a locking-arm provided with a socket to receive one of said studs to lock the wheel and carrier during the printing operation.

12. In an addressing-machine, the combination of a belt-carrier, means for intermittently operating said carrier comprising a wheel, studs at the side of said wheel, and a locking device adapted to engage one of said studs to prevent forward movement of the wheel and comprising a spring-buffer.

13. In an addressing-machine, the combination of a belt-carrier, means for intermittently operating said carrier comprising a wheel, studs at the side of the wheel, and a locking device comprising an arm, a buffer on said arm, and a supplemental arm arranged to receive one of said studs between itself and the buffer to lock the wheel.

14. In an addressing-machine, the combination of a belt-carrier, means for intermittently operating said carrier comprising a wheel, studs at the side of the wheel, and a locking device comprising a buffer, an arm arranged to receive one of the studs between itself and said buffer, and a spring connecting the buffer and said arm.

15. In an addressing-machine, the combination of a belt-carrier, means for intermittently operating said carrier comprising a wheel, studs at the side of the wheel, and a locking device comprising a pivoted arm, a spring-buffer carried by the arm, and means for holding the spring-buffer in the path of movement of said studs to engage one of said studs to lock the wheel.

16. In an addressing-machine, the combination of means for moving printing devices one at a time from a stack into printing position, a tiltable magazine for holding the stack of printing devices, a movable front for said magazine, and means for automatically closing said front when the magazine is moved from tilted to upright position.

17. In an addressing-machine, the combination of means for moving printing devices one at a time from a stack into printing position, a tiltable magazine for holding the stack of printing devices, a movable front for said magazine, hinges connecting the front to the magazine, one of said hinges being adapted to lock the front in open or closed positions, means for unlocking the front when the magazine is being moved from tilted to upright positions, and means for automatically closing the front after it is unlocked.

18. In an addressing-machine, the combination of means for moving printing devices one at a time from a stack into printing position, a tiltable magazine for holding the stack of printing devices, a movable front for said magazine, hinges connecting the front to the magazine, one of said hinges being adapted to lock the front in open or closed positions, means for unlocking the front when the magazine is being moved from tilted to upright positions, and a spring for closing the front after it is unlocked.

19. In an addressing-machine, the combination of means for moving printing devices one at a time from a stack into printing position, a tiltable magazine for holding the stack of printing devices, a movable front for the magazine, hinges connecting the front to the magazine, one of said hinges being adapted to lock the front in open or closed positions, an arm for holding the magazine in upright or tilted positions and adapted to be engaged by the pintle of the locking-hinge to unlock the front during the movement of the magazine from tilted to upright positions, and a spring for automatically closing the front after it is unlocked.

20. In an addressing-machine, the combination of a magazine for holding a stack of printing devices, a belt-carrier, feeding-dogs on the carrier arranged to move the lowermost printing device in the stack forward to printing position, said dogs being constructed to partly support the stack while moving the lowermost device from the stack, and the lower inner edge of the front of the magazine being beveled to permit a printing device to move forward before it rests entirely upon the carrier.

21. In an addressing-machine, the combination of a magazine for holding a stack of printing devices, a belt-carrier, feeding-dogs on the carrier arranged to move the lowermost printing device in the stack forward to printing position, said feeding-dogs being spaced apart lengthwise of the carrier to provide just sufficient space therebetween to accommodate a printing device, rearward projections on said dogs to partly support the stack while the dogs are moving the lowermost device from the stack, and a beveled lower inner edge at the front of the magazine to permit the printing device above the lowermost device to move forward slightly while the lowermost device is being fed from the stack.

22. In an addressing-machine, a carrier for moving the printing devices one by one from a stack and comprising a pair of link chains, feeding-dogs forming part of the chains and spaced apart lengthwise thereof to engage the printing devices, and a rearwardly-extending projection on each feeding-dog to make with the following feed-dog just sufficient space to receive a printing device and to partly support the stack while the lowermost device is being moved therefrom.

23. In an addressing-machine, a carrier for moving the printing devices one by one from a stack and comprising a pair of link chains, feeding-dogs forming part of the chains and spaced apart lengthwise thereof to engage the printing devices, and a rearwardly-extending projection on each feeding-dog having an inclined upper face.

24. In an addressing-machine, a magazine for holding the printing devices, a carrier for moving the printing devices from the magazine to printing position, feeding-dogs on the carrier, rearwardly-extending projections on the dogs provided with inclined upper faces, and an inclined lower inner edge at the bottom of the front of the magazine.

JOSEPH S. DUNCAN.

Witnesses:
WM. O. BELT,
FRANCES B. ALLEN.